US011988166B2

(12) United States Patent
Yuzawa

(10) Patent No.: US 11,988,166 B2
(45) Date of Patent: May 21, 2024

(54) ROTARY HEAT PUMP

(71) Applicant: MARUKO KEIHOKI CO., LTD., Ueda (JP)

(72) Inventor: Fumio Yuzawa, Ueda (JP)

(73) Assignee: MARUKO KEIHOKI CO., LTD., Ueda (JP)

( * ) Notice: Subject to any disclaimer, the term of this patent is extended or adjusted under 35 U.S.C. 154(b) by 0 days.

(21) Appl. No.: 18/017,688

(22) PCT Filed: Jan. 12, 2021

(86) PCT No.: PCT/JP2021/000690
§ 371 (c)(1),
(2) Date: Jan. 24, 2023

(87) PCT Pub. No.: WO2022/153364
PCT Pub. Date: Jul. 21, 2022

(65) Prior Publication Data
US 2023/0279824 A1 Sep. 7, 2023

(51) Int. Cl.
*F02G 1/055* (2006.01)
*F01C 1/22* (2006.01)
(Continued)

(52) U.S. Cl.
CPC ................ *F02G 1/055* (2013.01); *F01C 1/22* (2013.01); *F01C 21/06* (2013.01); *F02G 1/0445* (2013.01);
(Continued)

(58) Field of Classification Search
CPC .. F02G 1/043; F02G 1/055; F01C 1/22; F01C 21/06; F25B 9/14; F25B 30/00; F04C 18/22; F04C 29/04
See application file for complete search history.

(56) References Cited

U.S. PATENT DOCUMENTS 3,042,009 A * 7/1962 Froede .................... F02B 55/04 418/94
3,867,815 A 2/1975 Barrett
(Continued)

FOREIGN PATENT DOCUMENTS

JP 2-118363 A 5/1990
JP 3-117658 A 5/1991
(Continued)

OTHER PUBLICATIONS

Extended European Search Report for European Application No. 21919260.6, dated Jun. 21, 2023.
(Continued)

*Primary Examiner* — Loren C Edwards
(74) *Attorney, Agent, or Firm* — Birch, Stewart, Kolasch & Birch, LLP

(57) ABSTRACT

There is provided a rotary heat pump capable of realizing further miniaturization, compared with a current status. As means of solution, a rotary heat pump includes: a rotary drive section including: a rotary shaft; a stationary gear; a rotor that has a rotor gear engaged with the stationary gear and that makes an eccentric rotation; a rotary housing along a peritrochoid curve defined by the eccentric rotation of the rotor; and a first side housing and a second side housing that cover one end side and the other end side of the rotary housing and that fix the stationary gear; a heat exchange fin provided in each of a compression region that is demarcated by the rotor and the rotary housing and that has a smallest planar area and an expansion region that has the largest planar area; and a heat insulation portion formed in a boundary portion between the compression region and the expansion region.

4 Claims, 4 Drawing Sheets

(51) Int. Cl.

| | |
|---|---|
| ***F01C 21/06*** | (2006.01) |
| ***F02G 1/044*** | (2006.01) |
| ***F04C 18/22*** | (2006.01) |
| ***F04C 29/04*** | (2006.01) |
| *F25B 9/14* | (2006.01) |

(52) U.S. Cl.

CPC .............. *F04C 18/22* (2013.01); *F04C 29/04* (2013.01); *F25B 9/14* (2013.01)

(56) References Cited

U.S. PATENT DOCUMENTS

| | | | | |
|---|---|---|---|---|
| 4,357,800 | A | 11/1982 | Hecker | |
| 2004/0200217 | A1 | 10/2004 | Marchetti | |
| 2009/0139227 | A1 | 6/2009 | Nakasuka et al. | |
| 2011/0126794 | A1* | 6/2011 | Higashi | F01C 17/04 123/241 |
| 2013/0067906 | A1* | 3/2013 | Macarez | F02G 1/055 60/508 |
| 2015/0260091 | A1* | 9/2015 | Hsieh | F01C 1/22 165/51 |
| 2016/0305315 | A1* | 10/2016 | Jeng | F01P 1/02 |

FOREIGN PATENT DOCUMENTS

| | | | | | |
|---|---|---|---|---|---|
| JP | H03117658 | A | * | 5/1991 | F02G 1/043 |
| JP | 2008-38879 | A | | 2/2008 | |
| WO | WO 2007/029662 | A1 | | 3/2007 | |
| WO | WO 2010/125375 | A2 | | 11/2010 | |
| WO | WO 2010/125375 | A3 | | 11/2010 | |

OTHER PUBLICATIONS

International Search Report (PCT/ISA/210), issued in PCT/JP2021/000690, dated Mar. 2, 2021.

* cited by examiner

ROTARY HEAT PUMP

TECHNICAL FIELD

The present invention relates to a rotary heat pump, and an air conditioner and an automobile each equipped with the same.

BACKGROUND ART

Configurations of a heat pump (refrigerator) employing a Stirling engine type have been conventionally widely known. While a so-called reciprocating heat pump and a rotary heat pump are proposed as the heat pump of this type, it is said that the rotary heat pump is more suited than the reciprocating heat pump since being easier to achieve noise reduction and miniaturization. As recent rotary heat pumps, a rotary heat pump configured as disclosed in PTL 1 (JP-A-2008-38879) is proposed.

CITATION LIST

Patent Literature

PTL 1: JP-A-2008-38879 (Claim 2, FIGS. 1, 2, and the like)

SUMMARY OF INVENTION

Technical Problem

As illustrated in FIG. 6, a rotary heat pump RHP disclosed in PTL 1 employs configurations with two rotary members, i.e., a displacer-side rotary member DR and a power-side rotary member PR. It is desired that a heat pump as well as an air conditioner and an automobile each equipped with a heat pump is further miniaturized and reduced in weight from current dimensions. With the configurations of the rotary heat pump RHP disclosed in PTL 1, however, a problem remains that it is impossible to meet a requirement to further miniaturization and weight reduction of the heat pump as well as the air conditioner and the automobile each equipped with this heat pump.

Furthermore, rapid electrification has been recently underway at the level of laws and regulations in the automobile industry. However, energy densities of current batteries insufficiently meet demanded power of vehicle-mounted systems typified by, for example, a power controller, a drive system, a preventive safety device, and an in-vehicle air-conditioning system mounted in automobiles. Owing to this, efficiency improvement is adamantly demanded for all of these vehicle-mounted systems. The air conditioner that serves as the in-vehicle air conditioning system, in particular, has high power consumption and it may be said that the improvement in the efficiency of the air conditioner is a challenge to be solved as soon as possible in the electrification of automobiles.

Solution to Problem

Therefore, an object of the present invention is to provide a rotary heat pump capable of realizing further miniaturization, weight reduction and efficiency improvement, compared with a current status, an air conditioner equipped with this rotary heat pump, and an automobile capable of accelerating electrification.

That is, the present invention is a rotary heat pump, including: a rotary drive section including: a rotary shaft; a stationary gear into which the rotary shaft is inserted; a rotor that has a rotor gear formed to have larger diameter dimensions than outside diameter dimensions of the stationary gear and engaged with the stationary gear, and that makes an eccentric rotation as the rotary shaft rotates; a rotary housing formed to be capable of demarcating a radially outward region of the rotor along a peritrochoid curve defined by the eccentric rotation of the rotor; a first side housing that has an insertion hole for inserting the rotary shaft, that covers one end side of the rotary housing, and that fixes the stationary gear; and a second side housing that covers an other end side of the rotary housing; a heat exchange fin provided on an outer surface of the rotary housing in each of a compression region where a region demarcated by an outer circumferential surface of the rotor and an inner circumferential surface of the rotary housing has a smallest planar area and an expansion region where the region has the largest planar area; and a heat insulation portion provided in a required range portion including a boundary between the compression region and the expansion region in a circumferential direction.

Furthermore, there is also an invention of a rotary heat pump, including: a rotary drive section including: a rotary shaft; a stationary gear into which the rotary shaft is inserted; a rotor that has a rotor gear formed to have larger diameter dimensions than outside diameter dimensions of the stationary gear and engaged with the stationary gear, and that makes an eccentric rotation as the rotary shaft rotates; a rotary housing formed to be capable of demarcating a radially outward region of the rotor along a peritrochoid curve defined by the eccentric rotation of the rotor; a first side housing that has an insertion hole for inserting the rotary shaft, that covers one end side of the rotary housing, and that fixes the stationary gear; and a second side housing that covers an other end side of the rotary housing; a heat exchange fin provided on an outer surface of the rotary housing in each of a compression region where a region demarcated by an outer circumferential surface of the rotor and an inner circumferential surface of the rotary housing has a smallest planar area and an expansion region where the region has the largest planar area; and a bypass path that communicates a plurality of the expansion regions with one another.

With these inventions, heat dissipation and heat absorption can be performed in one rotary structure, so that it is possible to greatly reduce a size, reduce a weight, and improve efficiency of the rotary heat pump, compared with a conventional rotary heat pump.

Furthermore, it is preferable that the bypass path is coupled with a bypass hole formed in at least one of the first side housing and the second side housing in the expansion region.

It is thereby possible to prevent an increase in outer dimensions due to the bypass path.

It is further preferable that the rotor and the rotary housing are a Wankel rotor and a Wankel rotary housing.

It is thereby possible to employ a widely-known rotary structure, so that reliability of the rotary structure can be enhanced.

Furthermore, there is an invention as an air conditioner equipped with the rotary heat pump according to any one of the above and also an invention of an automobile to which this air conditioner is mounted.

These inventions can contribute to miniaturization, weight reduction, and high efficiency of the air conditioner.

Furthermore, these inventions can contribute to miniaturization and weight reduction of the automobile equipped with such an air conditioner. In addition, energy saving of the vehicle-mounted systems allows for acceleration of electrification of the automobile.

Advantageous Effects of Invention

With configurations of the rotary heat pump according to the present invention, rotary structure sections can be integrated into one part, so that it is possible greatly reduce the size, reduce the weight, and improve efficiency, compared with the rotary heat pump according to the conventional technique. In addition, it is possible to reduce the size, reduce the weight, and improve the efficiency of the air conditioner equipped with this rotary heat pump. Furthermore, by being equipped with this air conditioner, it is possible to reduce the size and the weight of the automobile and to accelerate the electrification of the automobile.

DESCRIPTION OF EMBODIMENTS

A rotary heat pump 100 according to the present invention will be described hereinafter with reference to the drawings.

First Embodiment

Figure 1:
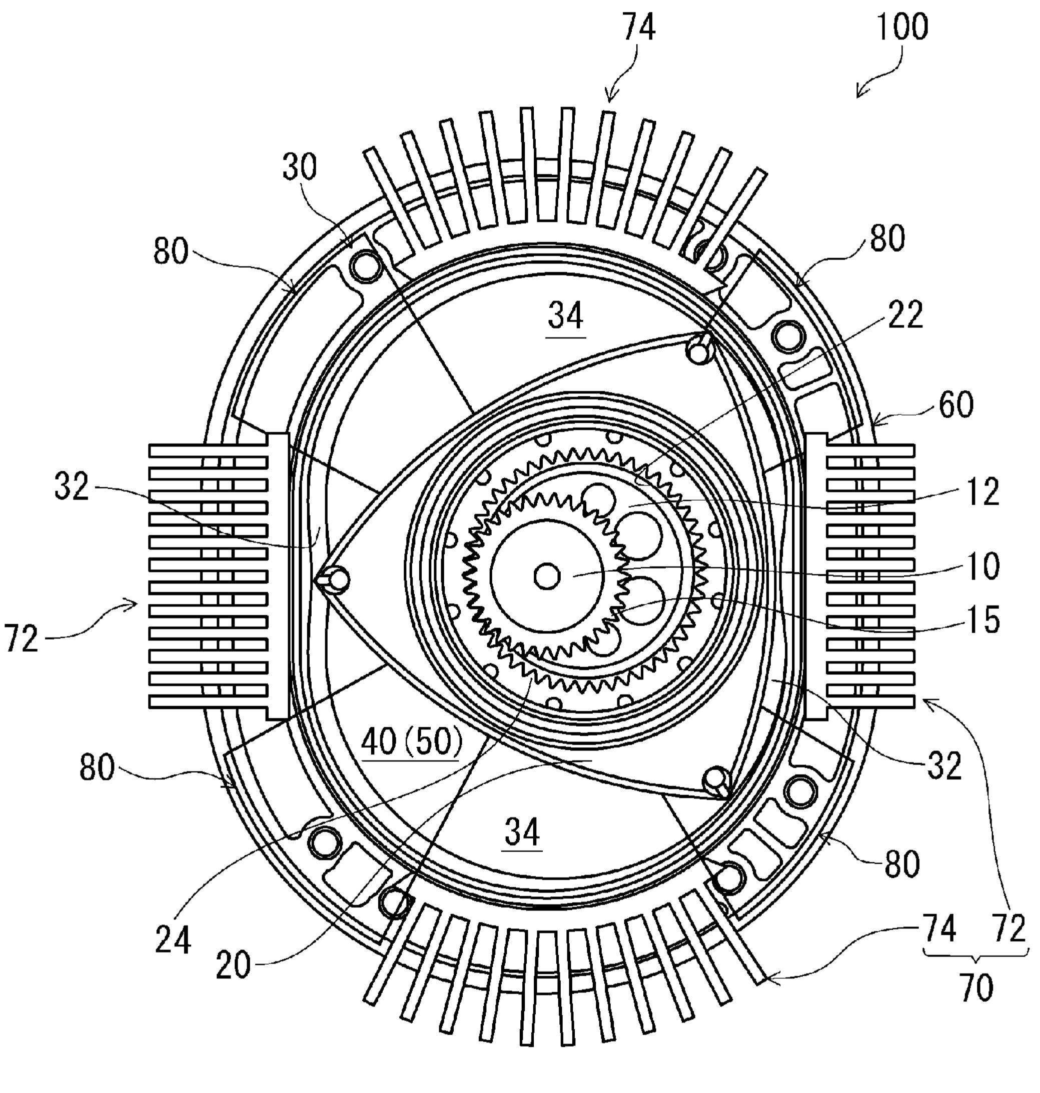
FIG. 1 is a plan view illustrating an internal structure of a rotary heat pump according to a first embodiment with a perspective view of a second side housing thereof.

FIG. 1 is a plan view illustrating an internal structure of the rotary heat pump 100 according to a first embodiment with a perspective view of a second side housing 50. The rotary heat pump 100 includes a rotary drive section 60 and heat exchange fins 70 provided on an outer wall surface of the rotary drive section 60. The rotary drive section 60 in the present embodiment has a rotary shaft 10, a stationary gear 15, a rotor 20, a rotary housing 30, a first side housing 40, and the second side housing 50. A structure of this rotary drive section 60 is such that parts formed from a metal material and heat insulation portions 80 that are parts formed from a heat insulating material are alternately disposed in a circumferential direction. As is obvious from FIG. 1, in the present embodiment, a form that employs a Wankel rotary drive section 60 in the rotary heat pump 100 will be described.

A first end portion of the rotary shaft 10 is rotatably supported in an internal space of the rotary drive section 60, while a second end portion thereof projects outside of the rotary drive section 60 from an insertion hole (not illustrated) of the first side housing 40. The second end portion of the rotary shaft 10 is coupled with an output shaft of a prime mover provided outside of the rotary drive section 60 (note that neither the prime mover nor the output shaft is illustrated) by a well-known scheme. Furthermore, the stationary gear 15 which is inserted from an outer surface side of the first side housing 40 and through which the rotary shaft 10 is inserted is fixedly screwed into the insertion hole of the first side housing 40. As such a rotary shaft 10, an eccentric shaft is suitably used as in the case of a rotary engine.

At least a required thickness range of an outer surface of the rotor 20 in the present embodiment is formed into an outer shape of a so-called Reuleaux triangle (Wankel rotor) by a heat insulating material, and a fitting hole 22 of the rotor 20 is fitted into a rotary journal 12 formed in the rotary shaft 10 so that the rotor 20 is fixed in a state of being rotatable together with the rotary shaft 10. In a plan view of the rotor 20, a rotor gear 24 that has larger diameter dimensions than outside diameter dimensions of the stationary gear 15 and the fitting hole 22, that is formed on the same axis as the fitting hole 22, and that is engaged with the stationary gear 15 is formed in a central portion of the rotor 20. The stationary gear 15 and the rotor gear 24 fixed to the first side housing 40 are engaged with each other only in a required range in the circumferential direction. Therefore, when the rotary shaft 10 rotates, the rotor 20 makes a motion of an eccentric rotation around the rotary shaft 10 (stationary gear 15).

The rotary housing 30 is formed into a cocoon-shaped cylindrical body (Wankel rotary housing) that can planarly demarcate a radially outward region of the rotor 20 along a peritrochoid curve defined by the eccentric rotation of the rotor 20. One opening surface of the rotary housing 30 is covered with the first side housing 40 in which the insertion hole (not illustrated) for inserting the stationary gear 15 into an interior of the rotary housing 30 (rotary drive section 60) is formed. The rotary shaft 10 is inserted into the stationary gear 15, and the rotary shaft 10, the stationary gear 15, and the first side housing 40 are sealed by a well-known scheme.

Moreover, the second side housing 50 is mounted to the other opening surface of the rotary housing 30 in a state of being sealed with the rotary housing 30. Basic configurations of such a rotary drive section 60 can be designed similar to configurations of a so-called rotary engine from which intake/exhaust sections and an ignition sections are excluded. In the present embodiment, it is preferable that spaces surrounded by the rotor 20, the rotary housing 30, the first side housing 40, and the second side housing 50 are sealed with seal members (not illustrated) provided appropriately. Each of the spaces is filled with helium that is an example of a refrigerant.

Furthermore, the heat exchange fins 70 are provided in a plurality of circumferential locations each over a required range on an outer surface of the rotary housing 30. In the circumferential direction of the rotary housing 30, a shape and a planar area of a region demarcated by an inner circumferential surface of the rotary housing 30 and an outer circumferential surface of the rotor 20 vary with the eccentric rotation of the rotor 20. In the present embodiment, when the rotary shaft 10 is set as a rotation center, two compression regions 32 where a demarcated region has a smallest planar area and two expansion regions 34 where the demarcated region has a largest planar area are formed, and the compression areas 32 and the expansion region 34 are alternately disposed at intervals of 90 degrees in the circumferential direction of the rotary housing 30 with a planar central portion of the rotary housing 30 assumed as a rotation center.

Out of the heat exchange fins 70, the fins provided upright on the outer wall surface of the rotary drive section 60 at positions corresponding to the compression regions 32 that are high-temperature regions are heat dissipation fins 72 and the fins provided upright on the outer wall surface of the rotary drive section 60 at positions corresponding to the expansion regions 34 that are low-temperature regions are heat absorption fins 74.

When the rotary drive section 60 in the present embodiment is driven to rotate by the prime mover, helium that is the refrigerant and that is filled in the internal space of the rotary drive section 60 is sequentially fed to the compression regions 32 and the expansion regions 34 that appear alternately in the circumferential direction of the rotary housing 30 to switch over between a high-temperature state and a low-temperature state. Furthermore, in the present embodiment, required range portions including at least boundaries between the compression regions 32 and the expansion regions 34 in the circumferential direction of the rotary housing 30, the first side housing 40, and the second side housing 50 are formed from the heat insulating material, and the heat insulating material portions serve as the heat insulation portions 80. Disposing such heat insulation portions 80 in boundary portions between the compression regions 32 and the expansion regions 34 enables even the single-rotor type rotary drive section 60 to exchange heat with outside air to be subjected to heat exchange in the heat dissipation fins 72 and the heat absorption fins 74. It is noted that the first side housing 40 and the second side housing 50 according to the present embodiment are entirely formed from the heat insulating material.

By employing the form of the rotary heat pump 100 according to the present embodiment, a fully gas phase Carnot cycle heat pump structure can be provided. While the rotor 20 according to the present embodiment rotates once in an internal space of the rotary housing 30, each of heat dissipation and heat absorption can be performed twice. These operations can ensure efficient heat exchange while ensuring small-sized, lightweight configurations and low noise. In addition, by accelerating the rotation of the output shaft of the prime mover to increase a revolving speed of the rotor 20, rapid heating and rapid cooling can be conveniently ensured.

Second Embodiment

Figure 2:
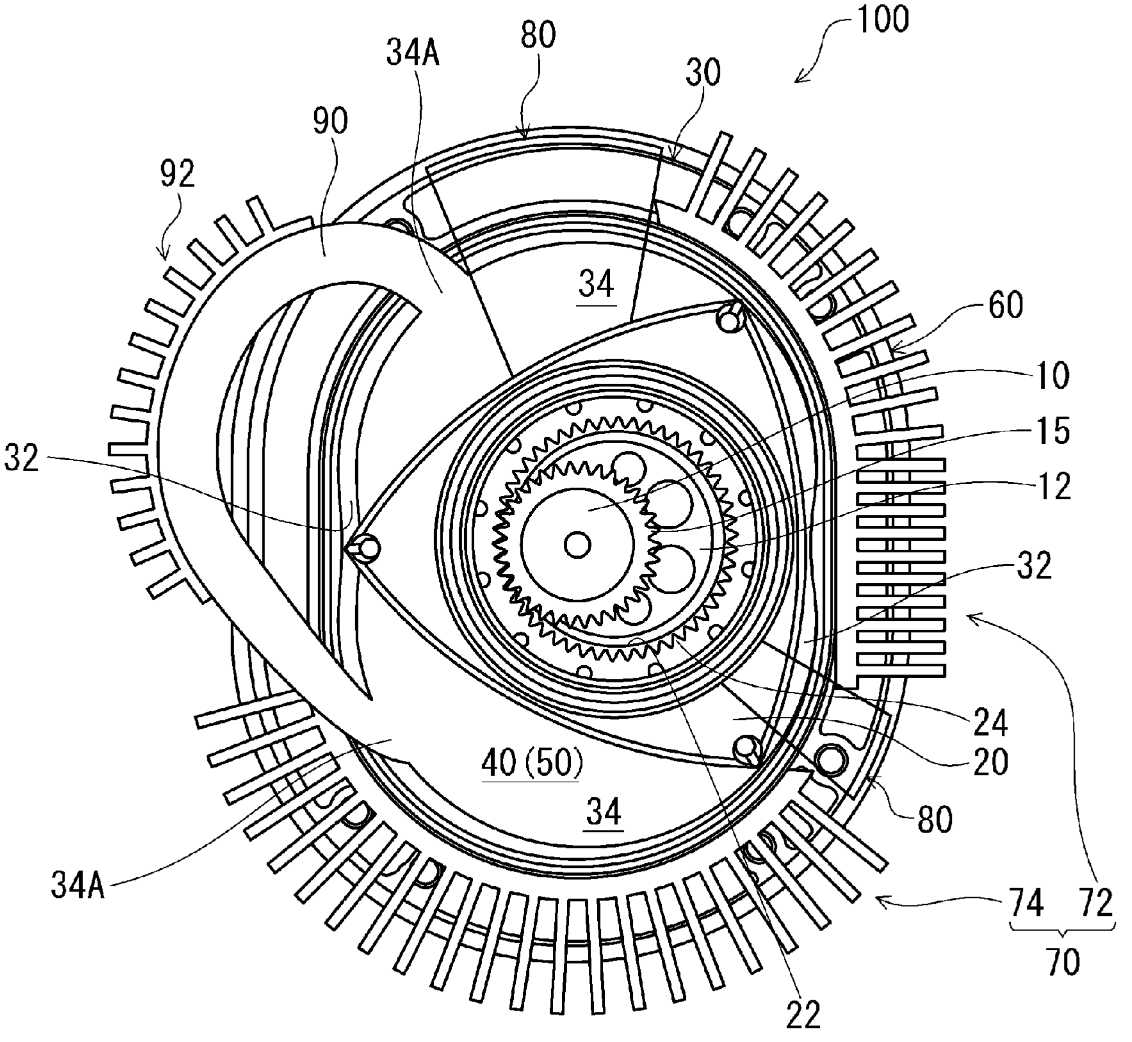
FIG. 2 is a plan view illustrating an internal structure of a rotary heat pump according to a second embodiment with a perspective view of a second side housing thereof.

FIG. 2 is a perspective plan view of the second side housing 50 of the rotary heat pump 100 according to a second embodiment, and illustrates a state in which the internal structure of the rotary heat pump 100 is depicted. In the present embodiment, same configurations as those in the first embodiment are denoted by the same reference signs used in the first embodiment and detailed descriptions of the configurations are omitted herein.

The rotary heat pump 100 according to the present embodiment is characterized by further having a bypass path 90 that communicates the two expansion regions 34 with each other, compared with the configurations described in the first embodiment. Furthermore, the rotary heat pump 100 differs from the rotary heat pump 100 according to the first embodiment in that each of a series of heat dissipation fins 72 and a series of heat absorption fin 74 are provided upright in one location and that the heat insulation portions 80 are provided only in two locations.

The bypass path 90 according to the present embodiment is coupled to bypass holes 34A penetrating the rotary housing 30 in the expansion regions 34, respectively. By communicating the two expansion regions 34 with each other in this way, it is possible to greatly increase a volume of each expansion region 34 continuous with the compression region 32 and promote a fall in temperature due to expansion of helium. While the two expansion regions 34 are brought into communication in the present embodiment, the heat absorption fins 74 are provided upright only on the outer wall surface of the rotary housing 30 corresponding to the expansion region 34 provided right after the compression region 32. Furthermore, the expansion region 34 (expansion region 34 located right before the compression region 32 that is the high-temperature region) communicated with the above expansion region 34 by the bypass path 90 may be entirely formed in the heat insulation portion 80. Moreover, as illustrated in FIG. 2, a bypass path heat sink 92 can be provided on the bypass path 90.

Moreover, helium is not substantially compressed in the compression region 32 at a position put between the expansion regions 34 that are brought into communication by the bypass path 90 in the rotary heat pump 100 according to the present embodiment, so that this part is not provided with the heat dissipation fins 72 or the heat insulation portion 80. As described above, in the rotary heat pump 100 according to the present embodiment, the number of the heat dissipation fins 72, the heat absorption fins 74, and the heat insulation portions 80 to be provided can be reduced, so that it is conveniently possible to contribute to further miniaturization, weight reduction, and manufacturing cost reduction of the rotary heat pump 100.

As described above, the rotary heat pump 100 according to the present invention has been described on the basis of the embodiments; however, the present invention is not limited to the above embodiments. For example, the form in which the rotary heat pump 100 according to the embodiments described above employs the Wankel rotary drive section 60 has been described; however, the present invention is not limited to this structure and a structure of a well-known rotary drive section 60 can be applied as appropriate. When many expansion regions 34 are present in the structure of the rotary drive section 60, a plurality of, i.e., three or more expansion regions 34 may be communicated with one another by the bypass path 90. It is thereby possible to provide expansion areas formed from the plurality of expansion regions 34 in a plurality of locations in the circumferential direction of the rotary drive section 60.

Figure 3:
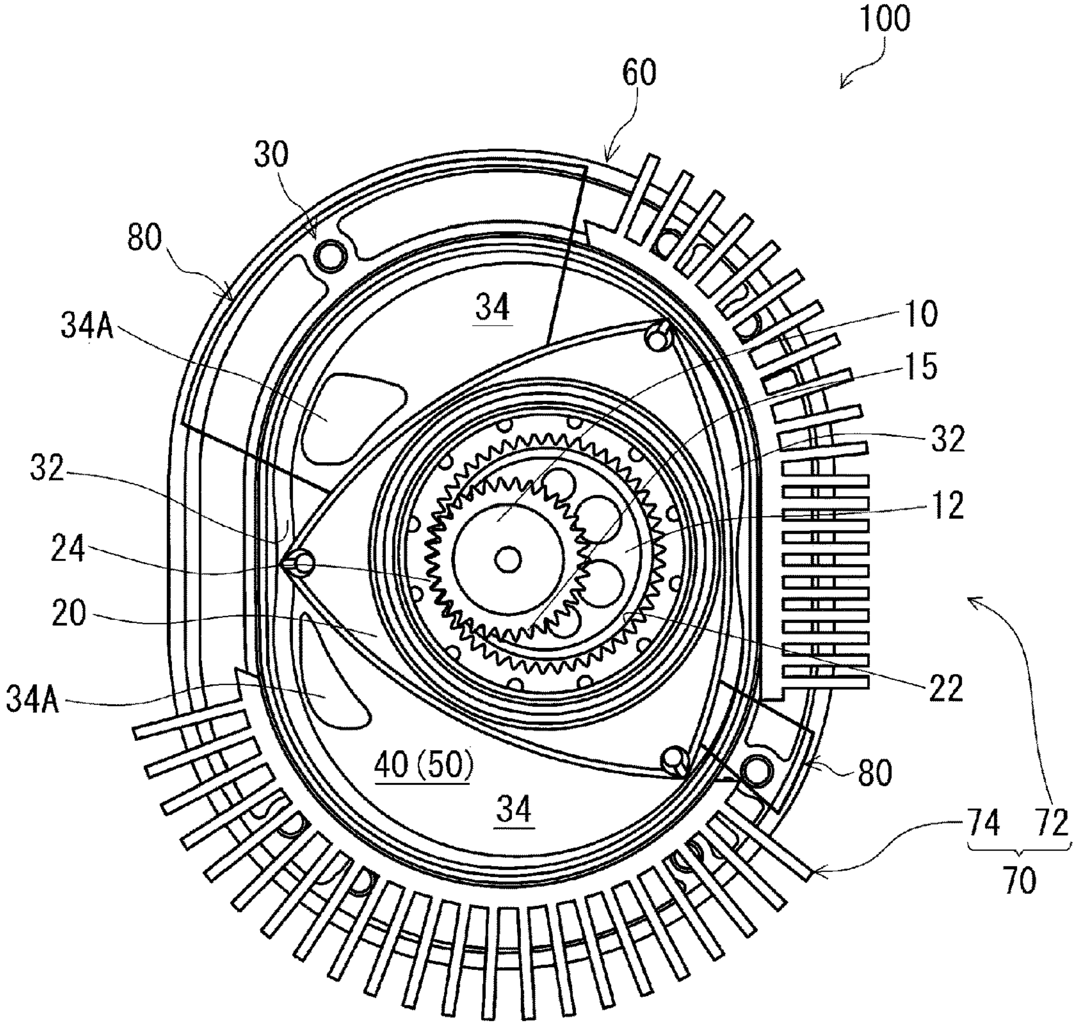
FIG. 3 is an explanatory diagram illustrating an internal structure of a rotary heat pump according to a modification of the second embodiment with a perspective view of a second side housing thereof.

Furthermore, as illustrated in FIG. 2, in the rotary heat pump 100 according to the second embodiment, the bypass holes 34A are provided in the rotary housing 30 in the expansion regions 34 and the bypass path 90 is coupled with the bypass holes 34A; however, the present invention is not limited to this form. As illustrated in FIG. 3, the rotary heat pump 100 can have a form in which the bypass holes 34A passing through the first side housing 40 in a thickness direction are provided as an alternative to the bypass holes 34A provided in the rotary housing 30, and in which the bypass holes 34A in a plurality of expansion regions 34 are coupled together by the bypass path 90. These bypass holes 34A can also be provided in the second side housing 50 instead of the first side housing 40, or can be provided in both the first side housing 40 and the second side housing 50. By providing the bypass path 90 within a planar region of the rotary drive section 60 in this way, it is conveniently possible to reduce an area of the bypass path 90 that occupies the plane, compared with the rotary heat pump 100 according to the second embodiment.

Similarly, while the form in which the bypass path heat sink 92 is provided on the bypass path 90 and in which heat exchange (heat absorption) can be also performed in the bypass path 90 is described in the second embodiment, the present invention is not limited to this form. The bypass path 90 can be formed from a heat insulating material or a form in which the bypass path heat sink 92 is not provided can be employed.

Moreover, the form in which helium with high heat conductivity is filled into the rotary drive section 60 as the refrigerant is described in the present embodiments; however, the refrigerant with such properties is not limited to helium and a well-known refrigerant such as hydrogen or carbon dioxide can be used as appropriate.

Figure 4:
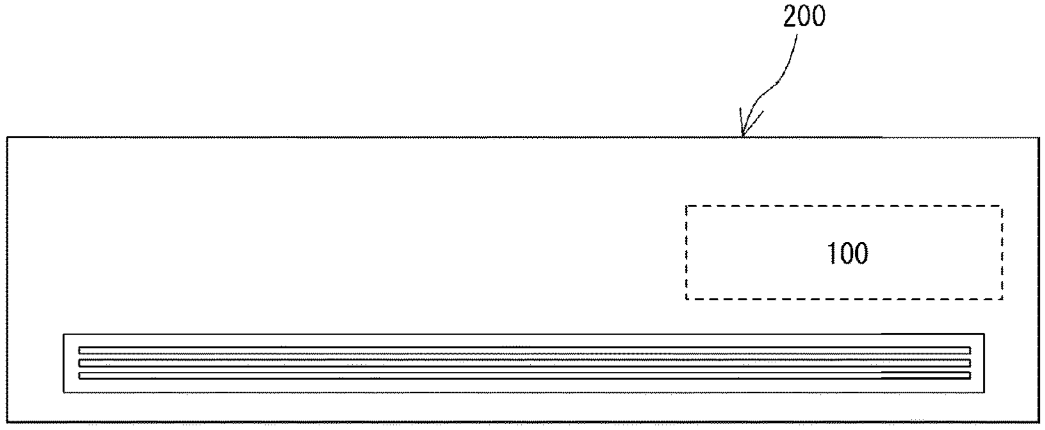
FIG. 4 is a schematic diagram illustrating an air conditioner equipped with the rotary heat pump according to the present embodiments.

Furthermore, as illustrated in FIG. 4, there is also an invention as an air conditioner 200 equipped with the rotary heat pump 100 described above.

Figure 5:
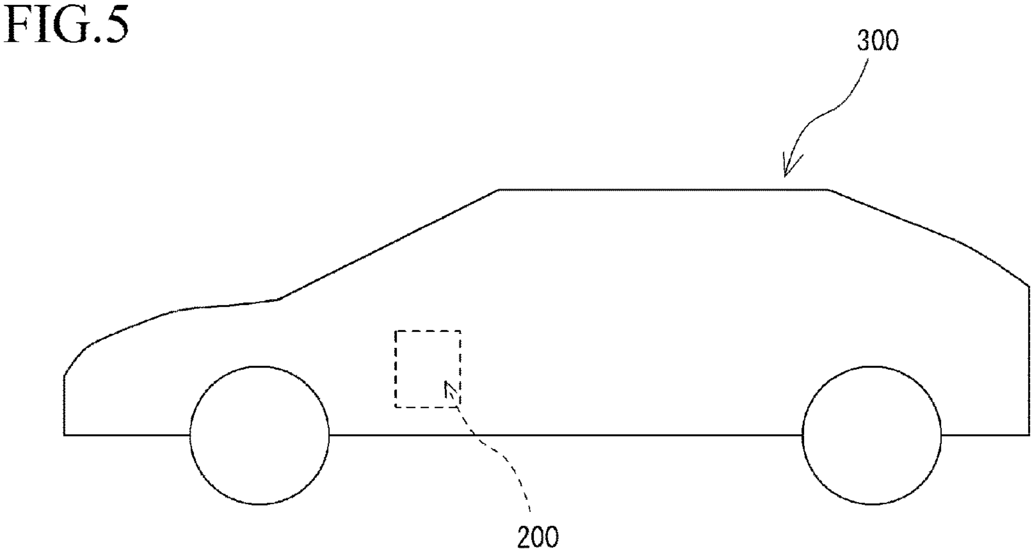
FIG. 5 is an explanatory diagram illustrating an automobile to which the air conditioner illustrated in FIG. 4 is attached.
Figure 6:
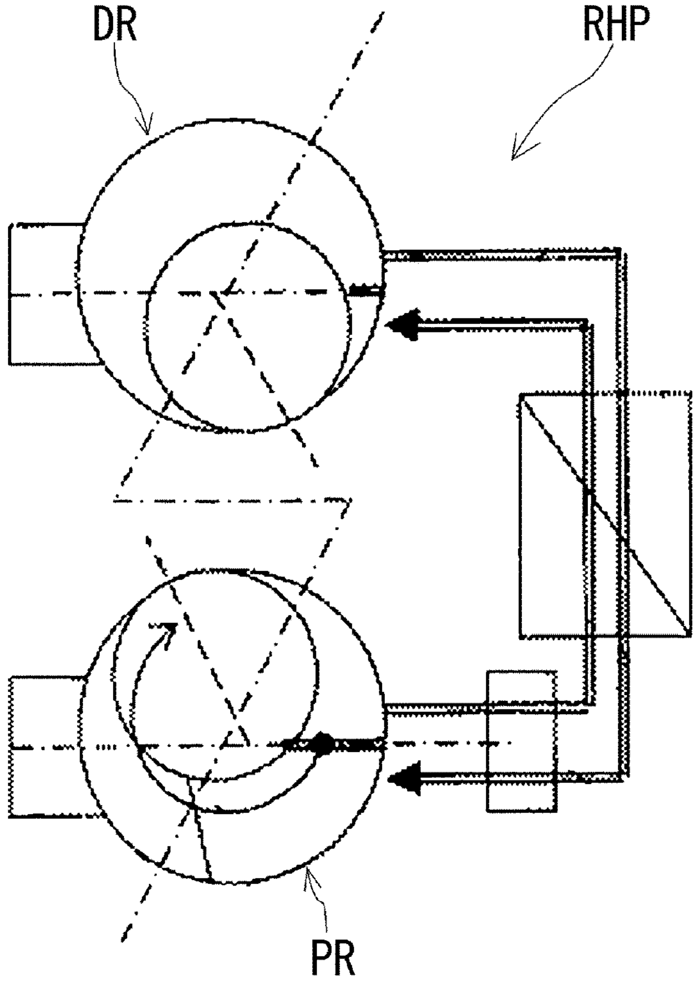
FIG.6 PRIOR ART
FIG. 6 is a schematic configuration diagram of a rotary heat pump according to a conventional technique.

Moreover, as illustrated in FIG. 5, there is also an invention of an automobile 300 to which the air conditioner 200 equipped with the rotary heat pump 100 described in the present embodiments is attached. Since specific configurations of the air conditioner 200 and the automobile 300 are well known, detailed descriptions thereof are omitted herein. The air conditioner 200 according to the present invention can realize miniaturization, weight reduction, and high efficiency. In addition, the automobile 300 according to the present invention can not only realize the miniaturization and the weight reduction but also accelerate electrification of the automobile 300 by greatly saving energy.

Furthermore, a form in which the rotary heat pumps 100 described above are disposed in series in an axial direction of the rotary shaft 10 can be employed. This results in an increase in an occupied volume of the rotary heat pumps 100; however, if a long and thin space can be allocated, it is possible to provide the rotary heat pump 100 with a higher performance and the air conditioner 200 and the automobile 300 each equipped with this rotary heat pump 100.

Moreover, forms in which the modification described in the specification or other well-known configurations are combined with the configurations in the present embodiments described so above can be employed.

What is claimed is:

1. A rotary heat pump, comprising:

a rotary drive section including: a rotary shaft; a stationary gear into which the rotary shaft is inserted; a rotor that has a rotor gear formed to have larger diameter dimensions than outside diameter dimensions of the stationary gear and engaged with the stationary gear, and that makes an eccentric rotation as the rotary shaft rotates; a rotary housing formed to be capable of demarcating a radially outward region of the rotor along a peritrochoid curve defined by the eccentric rotation of the rotor; a first side housing that has an insertion hole for inserting the rotary shaft, that covers one end side of the rotary housing, and that fixes the stationary gear; and a second side housing that covers an other end side of the rotary housing;

a heat exchange fin provided on an outer surface of the rotary housing in each of a compression region where a region demarcated by an outer circumferential surface of the rotor and an inner circumferential surface of the rotary housing has a smallest planar area and an expansion region where the region demarcated by the outer circumferential surface of the rotor and the inner circumferential surface of the rotary housing has a largest planar area;

a bypass path that communicates a plurality of the expansion regions with one another;

wherein the heat exchange fin includes a heat absorption fin provided to the expansion region on an upstream side among two of the expansion regions communicated one another by the bypass path, and a heat dissipation fin provided to the compression region located right after the expansion region on a downstream side among the expansion regions communicated one another by the bypass path, and a bypass path heat sink is provided to the bypass path.

2. The rotary heat pump according to claim 1, wherein the bypass path is coupled with a bypass hole formed in at least one of the first side housing and the second side housing in the expansion region.

3. The rotary heat pump according to claim 2, wherein the rotor and the rotary housing are a Wankel rotor and a Wankel rotary housing.

4. The rotary heat pump according to claim 1, wherein the rotor and the rotary housing are a Wankel rotor and a Wankel rotary housing.

* * * * *